(12) United States Patent
Sawamoto

(10) Patent No.: US 7,184,220 B2  
(45) Date of Patent: Feb. 27, 2007

(54) PROJECTION ZOOM LENS AND PROJECTOR

(75) Inventor: Akira Sawamoto, Suwa (JP)

(73) Assignee: Nittoh Kogaku K.K., Nagano (JP)

( * ) Notice: Subject to any disclaimer, the term of this patent is extended or adjusted under 35 U.S.C. 154(b) by 0 days.

(21) Appl. No.: 11/274,427

(22) Filed: Nov. 15, 2005

(65) Prior Publication Data
US 2006/0109564 A1  May 25, 2006

(30) Foreign Application Priority Data
Nov. 17, 2004  (JP) .............................. 2004-333173

(51) Int. Cl.
*G02B 15/14* (2006.01)
(52) U.S. Cl. .................. 359/680; 359/691; 359/793
(58) Field of Classification Search ................ 359/680, 359/681, 682, 683, 684, 685, 686, 687, 688, 359/783
See application file for complete search history.

(56) References Cited

U.S. PATENT DOCUMENTS 6,169,636 B1*    1/2001  Kreitzer .................. 359/691
6,259,508 B1*    7/2001  Shigematsu .............. 355/53
6,721,106 B2*    4/2004  Yamamoto et al. ......... 359/689
7,006,300 B2*    2/2006  Shinohara ................ 359/689
7,066,607 B2*    6/2006  Kwon .................... 353/98
2004/0257671 A1* 12/2004  Kim et al. ............... 359/680

FOREIGN PATENT DOCUMENTS

JP        2002-148515         5/2002

* cited by examiner

*Primary Examiner*—Timothy Thompson  
(74) *Attorney, Agent, or Firm*—Thompson Hine LLC

(57) ABSTRACT

A projection zoom lens that is suited to projector with a DMD is provided. The projection zoom lens projects, onto a screen, projection light from the DMD and comprises, in order from a screen side, a first lens group with negative refractive power and a second lens group with positive refractive power. The second lens group includes, from the DMD side, a final lens that is a positive lens, a pre-final lens that is a negative biconcave lens positioned next to the final lens, and a stop, and both surfaces of the pre-final lens are aspherical. Using the projection zoom lens, it is possible to realize the compact projector that can project bright images with high resolution that makes full use of the characteristics of the DMD.

6 Claims, 4 Drawing Sheets

PROJECTION ZOOM LENS AND PROJECTOR

CROSS-REFERENCE TO RELATED APPLICATION

This application is based upon and claims the benefit of priority from the prior Japanese Patent Application No. 2004-333173, filed Nov. 17, 2004, the entire contents of which are incorporated herein by reference.

BACKGROUND

The present invention relates to a projection zoom lens and a projector for projecting an image onto a screen.

Conventionally, a liquid crystal device is often used as the light valve of a projector. In recent years, in place of a liquid crystal device, devices equipped with a plurality of elements that form images by mechanically changing the directions of reflection of light using a micromachining technique have been realized. One example of such a device is a DMD (digital mirror device or display) in which minute mirror-surface elements (micromirrors) are arranged in an array corresponding to pixels and an image is displayed by controlling the angles of the respective mirror surfaces. Compared to a liquid crystal device, a light modulator (light valve) in which pixels are composed of micromirrors has faster response and produces a brighter image, so that a light modulator is suited to the realization of a compact projector with high luminance and high image quality.

In a DMD, the angle by which the micromirrors rotate when an image is formed is around ±10 to 12 degrees, so that illumination light (source light) is converted into effective or active reflected light that is projection light (modulated light) for forming an image and non-effective or inactive reflection light that is not active in forming the image. Accordingly, to project the active projection light from a DMD using a projection lens, a design is used where the exit pupil is positioned at the final lens located closest to the DMD that serves as the light modulator. In the Japanese Laid-Open Patent Publication No. 2002-148515, an aspherical surface is introduced on the final lens-side of a convex lens positioned just before the final lens of a second lens group for providing a projection zoom lens with a simple and compact construction of around ten lenses.

The effective way to make a projection zoom lens compact is to reduce the number of lenses. However, when the number of lenses falls, the aberration-correcting performance also falls.

SUMMARY

It is an object of the present invention to provide a projection zoom lens (a projection zoom lens system) that can achieve good aberration-correcting performance. It is a further object of the present invention to provide a projection zoom lens system that is compact and can display sharp images, as well as a projector using the same.

One of aspects of the present invention is a projection zoom lens (a projection zoom lens system) that projects, onto a screen, projection light from a light modulator including a plurality of elements for changing directions of reflection of light respectively so as to generate an image, the projection zoom lens comprising, in order from a screen side thereof, a first lens group with negative refractive power and a second lens group with positive refractive power, wherein the second lens group includes, from a light modulator side thereof, a final lens that is a positive lens, a pre-final lens that is a negative biconcave lens positioned next to the final lens, and a stop, and both surfaces of the pre-final lens are aspherical. In this projection zoom lens or zoom lens system, the lens arrangement of the light modulator end of the second lens group is simple. In this arrangement, the negative pre-final lens is disposed next to the final positive lens for collimating, and a stop corresponding to the exit pupil is disposed next to the negative pre-final lens. In addition, in this lens arrangement, the negative pre-final lens has the smallest diameter.

In the projection zoom lens system, the pre-final negative lens is biconcave and both surfaces thereof, which are the surfaces having smallest diameter in the lens system, are aspherized. By aspherizing both surfaces of the most compact lens, full use can be made of the aberration-correcting performance of aspherical surfaces at low cost, and the total number of lenses constructing the lens system can be reduced.

One of the projection zoom lens according to the present invention includes the first lens group with a three-lens construction including, from a screen side thereof, a negative meniscus lens that is convex on the screen side, a biconcave negative lens, and a positive meniscus lens that is convex on the screen side, and the second lens group with a four-lens construction including, from the screen side, two positive meniscus lenses that are convex on respective screen sides, the stop, the negative pre-final lens, and the positive final lens. By the projection zoom lens system having this lens arrangement, a sufficient aberration-correcting performance using a total of just seven lenses can be achieved. Accordingly, the projection zoom lens can be made even more compact. In addition, a projector including the projection zoom lens according to the present invention, the light modulator, and a light source system that emits light onto the light modulator can be made more compact.

In the projection zoom lens according to the present invention, to favorably correct aberration, a certain amount of refractive power is required for the second group that includes aspherical surfaces. Accordingly, a combined focal length f1 of the first lens group and a combined focal length f2 of the second lens group should preferably satisfy the following condition (A). It is more preferable that the power of the second lens group is increased to satisfy the following condition (B).

$$0.3 < |f2/f1| < 1.0 \qquad (A)$$

$$0.5 < |f2/f1| < 0.7 \qquad (B)$$

The upper limit for the condition (A) refers to the difficulty in maintaining favorable optical characteristics due to the difficulty in correcting spherical aberration and coma aberration when the negative refractive power of the first lens group is high. The lower limit for the condition (A) refers to the difficulty in correcting coma aberration, the increase in the length of the lens system, and the increase in the external diameter of the lenses on the magnifying side when the negative refractive power of the first lens group is low. Also, to make better use of the aberration correcting performance of the second lens group, as described above, the distribution of refractive power should preferably be set within the range of condition (B).

The power of the first lens group should preferably be set relative to the power of the entire lens system so as to satisfy condition (C) below. That is, a combined focal length f1 of the first lens group and a combined focal length fw of the projection zoom lens at a wide-angle end should preferably satisfy condition (C).

$$1.0<|f1/fw|<3.0 \quad (C)$$

If the upper limit of expression (C) is exceeded, the power of the first lens group is weakened and the lens system as a whole becomes large, so that it is not possible to realize a compact projection zoom lens at low cost. If the value fl/fw falls below the lower limit of expression (C), the negative refractive power of the first lens group is high, it becomes difficult to correct spherical aberration and coma aberration, and as a result it is difficult to maintain favorable optical characteristics.

A combined focal length fl of the first lens group and a spatial distance dw between the first lens group and the second lens group at a wide-angle end of the projection zoom lens should preferably satisfy the following condition (D).

$$0.1<|dw/f1|<0.28 \quad (D)$$

When the upper limit in expression (D) is exceeded, the distance (spatial distance) dw between the first lens group and the second lens group increases, which makes the entire optical system larger and therefore makes it impossible to realize a compact projection zoom lens at low cost. When the value dw/fl falls below the lower limit in expression (D), it is difficult to balance the various types of aberration and therefore it is difficult to maintain favorable optical performance.

BRIEF DESCRIPTION OF THE DRAWINGS

The accompanying drawings, which are incorporated in and constitute a part of the specification, illustrate embodiments of the invention, and together with the general description given above and the detailed description given below, serve to explain the principles of the invention.

DETAILED DESCRIPTION

Figure 1:
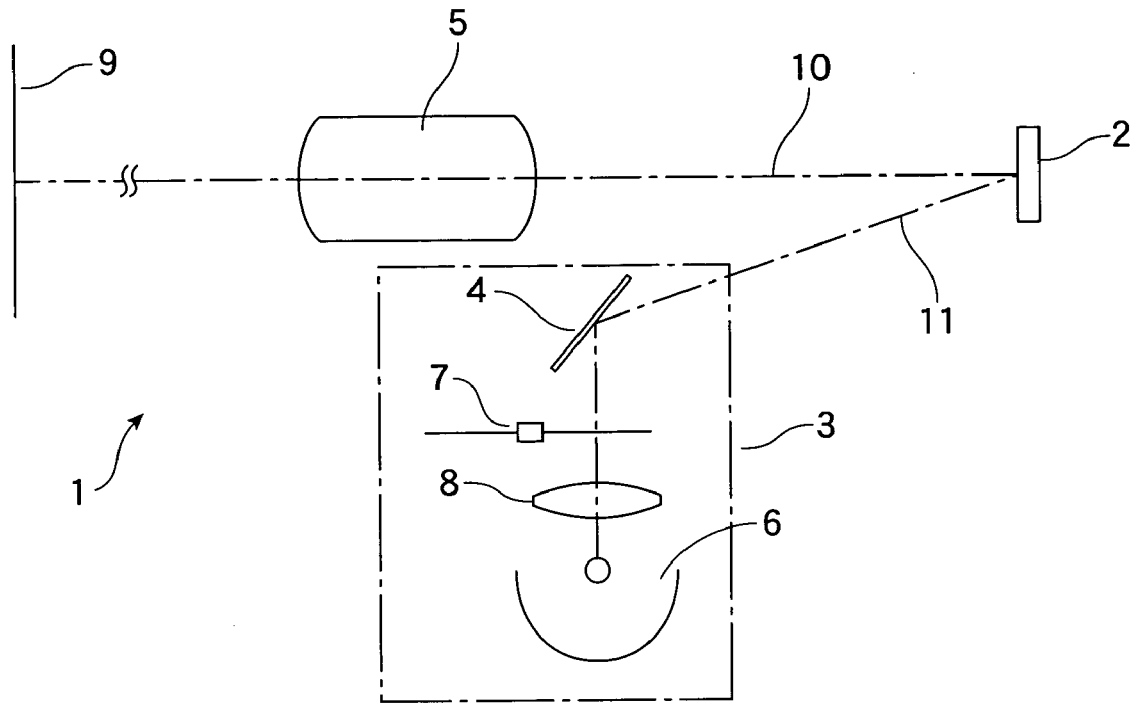
FIG. 1 shows an arrangement of a projector.

FIG. 1 shows the overall construction of a projector 1 that uses a DMD. The projector 1 includes a DMD 2 as a light modulator (light valve), a light source system 3 that emits illuminating light 11 onto the DMD 2, and a projection zoom lens 5 for projecting projection light 10 that has been reflected in an active direction by the DMD 2 onto a screen 9. The projector 1 shown in FIG. 1 is a single-panel type video projector, and the light source system 3 comprises a white light source 6, such as a halogen lamp, and a rotating color splitting filter 7 in the shape of a disc. Light of the three primary colors red, green, and blue is emitted onto the DMD 2 using time division. By controlling the elements of DMD 2 corresponding to the individual pixels at the timing at which the light of the respective colors is shone, a color image is displayed.

A condenser lens 8, a mirror 4, etc., for processing (collimating, paralleling etc.) the light from the light source 6 are also arranged as necessary in the light source system 3 in accordance with the configurations and/or constructions of a variety of projectors. When the normal of the DMD 2 matches the optical axis of the projection lens system 5, the image circle is reduced, which makes it possible to reduce the diameter of the projection lens system 5. In addition, it becomes easy to separate the projection light (active light) 10 and the inactive light. Accordingly, the angle of incidence for the DMD 2 from the light source system 3 is limited and the optical axis of the light source system 3 becomes almost the same direction as the optical axis of the projector lens system 5. In order to achieve favorable optical characteristics (aberration characteristics and the like) while keeping a long back focus of the projection lens system 5 to prevent the projection lens system 5 from being affected by the light source system 3, the lens system 5 uses aspherical surfaces to reduce the number of lenses and make the overall construction more compact.

Figure 2A:
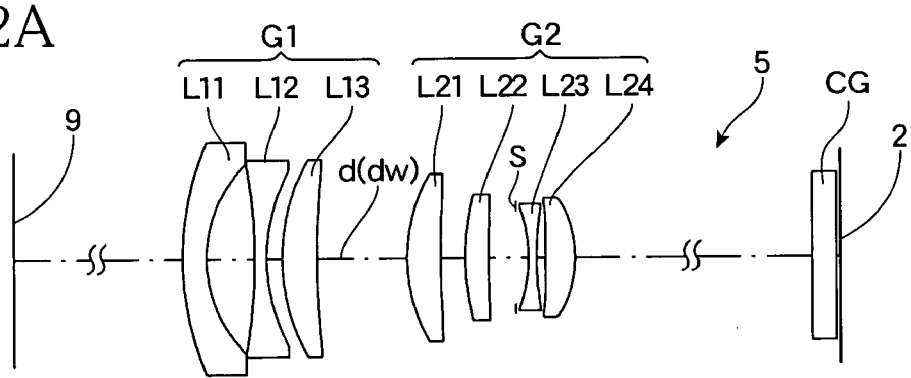
FIGS. 2A and 2B show arrangements of a projection zoom lens according to the present invention, with FIG. 2A showing the arrangement of lenses at the wide-angle end and FIG. 2B showing the arrangement of lenses at the telephoto end.
Figure 2B:
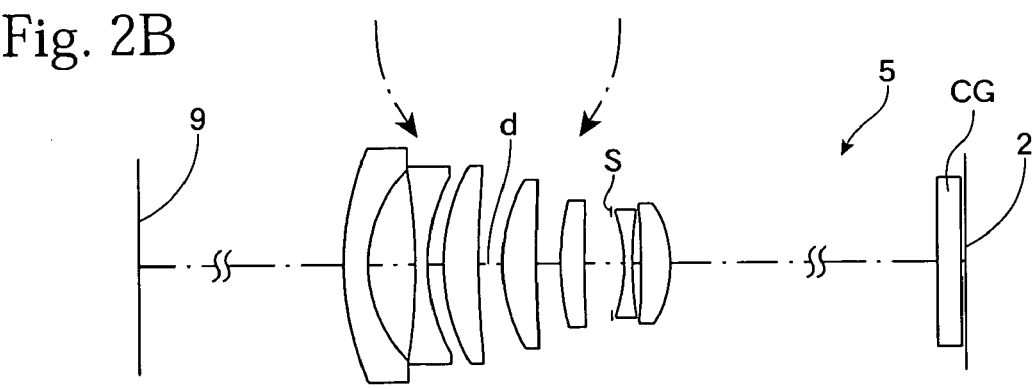

FIGS. 2A and 2B show one of examples of a projection zoom lens 5 according to the present invention. FIG. 2A shows the arrangement of the respective lenses at the wide-angle end in a state where images are enlarged and displayed, while FIG. 2B shows the arrangement of the respective lenses at the telephoto end that is a standard state. The projection zoom lens 5 of the present embodiment is composed of seven lenses that are numbered L11 to L24 and grouped into two lens groups G1 and G2 from a side of the screen 9 (screen side). Detailed data on the respective lenses is given below.

The first lens group G1 disposed on the screen side has an overall negative refractive power and is composed of, in order from the screen side, a positive meniscus lens L11 that is positioned closest to the screen 9 (i.e., at the front) and is convex on the screen side, a negative meniscus lens L12 that is biconcave, and a positive meniscus lens L13 that is convex on the screen side.

The second lens group G2 positioned on the side of the DMD 2 (DMD side or light modulator side) has an overall positive refractive power and is composed of, in order from the screen side, a positive meniscus lens L21 that is convex on the screen side, a positive meniscus lens L22 that is also convex on the screen side, a negative pre-final lens L23 that is biconcave, and a positive final lens L24 that is biconvex and positioned closest to the DMD 2. In addition, a "stop" (aperture) S is disposed on the screen side of the negative pre-final lens L23 positioned next to or just before the final lens L24, and both surfaces 11 and 12 of the negative pre-final lens L23 are aspherized. Accordingly, the second lens group G2 of this lens system 5 includes, from the DMD side, the final positive lens L24, the pre-final lens negative biconcave lens L23 positioned next to the final lens L24, and the stop S, and the both surfaces of the pre-final lens L23 are aspheric.

In the projection zoom lens (lens system) 5, an image-forming characteristic for the range from the wide-angle end to the telephoto end can be achieved across by moving both the first lens group G1 and the second lens group G2 to reduce the distance d between the second lens group G2 and the first lens group G1.

In the lens data shown below, "Rdy" represents the radius of curvature (mm) of each lens disposed in order from the screen side, "Thi" represents the distance (mm) between the respective lens surfaces disposed in order from the screen side, "nd" represents the refractive index (d line) of each lens in order from the screen side, and "vd" represents the Abbe number (d line) of each lens in order from the screen side. Also, the expression "INFINITY" indicates a flat surface, and in the "Type" column, "SPH" is an abbreviation for "spherical" and "ASP" an abbreviation for "aspherical". In addition, the lens system is precisely designed including the cover glass CG installed on the light-emitting side of the DMD 2.

| LENS DATA | | | | | | |
|---|---|---|---|---|---|---|
| No. | Rdy | Type | Thi | nd | vd | |
| 1 | 43.018 | SPH | 1.60 | 1.72825 | 28.46 | lens L11 |
| 2 | 18.452 | SPH | 5.89 | | | |
| 3 | −69.203 | SPH | 1.50 | 1.48749 | 70.24 | lens L12 |
| 4 | 25.395 | SPH | 1.49 | | | |
| 5 | 26.677 | SPH | 4.55 | 1.83400 | 37.16 | lens L13 |
| 6 | 185.001 | SPH | d | | | |
| 7 | 25.331 | SPH | 3.92 | 1.69680 | 55.53 | lens L21 |
| 8 | 406.287 | SPH | 3.00 | | | |
| 9 | 30.023 | SPH | 2.92 | 1.74320 | 49.34 | lens L22 |
| 10 | 119.757 | SPH | 5.53 | | | |
| 11 | −27.655 | ASP | 1.00 | 1.80518 | 25.42 | lens L23 |
| 12 | 26.573 | ASP | 1.93 | | | |
| 13 | 126.608 | SPH | 3.73 | 1.74320 | 49.34 | lens L24 |
| 14 | −17.870 | SPH | 28.52 | | | |
| 15 | INFINITY | | 3.00 | 1.48749 | 70.24 | cover glass CG |
| 16 | INFINITY | | 0.48 | | | |
| 17 | INFINITY | | 0.00 | | | DMD2 |

The distance d (mm) between the first and second lens groups is as follows.

| | |
|---|---|
| Wide-angle end (dw) | 12.29 |
| Intermediate position | 6.36 |
| Telephoto end | 3.07 |

The aspherical coefficients of the 11th and 12th surfaces that are both surfaces of the negative pre-final lens L23 positioned just before the final lens L24 are as follows.

11th Surface $R=-27.655, K=0.0000$ $A=-8.6622\times10^{-5}, B=1.9452\times10^{-6}$ $C=-4.576\times10^{-8}, D=4.8140\times10^{-10}$ The aspherical surfaces are expressed by Expression (1) using the coefficients K, A, B, C, and D given above with X as the coordinate in the optical axis direction, Y as the coordinate in a direction perpendicular to the optical axis, the direction in which light propagates as positive, and R as the paraxial radius of curvature. This is also the case hereinafter.

$$X=(1/R)Y^2[1+\{1-(1+K)(1/R)^2Y^2\}^{1/2}]+AY^4+BY^6+CY^8+DY^{10} \quad (1)$$

12th Surface $R=26.573, K=0.0000$ $A=-4.9112\times10^{-5}, B=1.7564\times10^{-6}$ $C=-4.1212\times10^{-8}, D=4.0805\times10^{-10}$ Other values (mm) for the projection zoom lens of the present embodiment are as follows.

| | |
|---|---|
| Combined focal length of the first lens group f1 | −51.915 |
| Combined focal length of the second lens group f2 | 29.912 |
| Distance dw between the first and second lens groups at the wide-angle end | 12.29 |
| Combined focal length fw of the lens system at the wide-angle end | 28.328 |
| Combined focal length ft of the lens system at the telephoto end | 34.056 |
| Zoom ratio | 1.2 |
| Backfocus length (when the distance from the screen to the closest lens in the lens system to the screen is 2400 mm) | 38.783 |

Accordingly, the respective conditions described above are as follows.

$|f2/f1|=0.5762$ $|f1/fw|=1.8327$ $|dw/f1|=0.2367$

Figure 3:
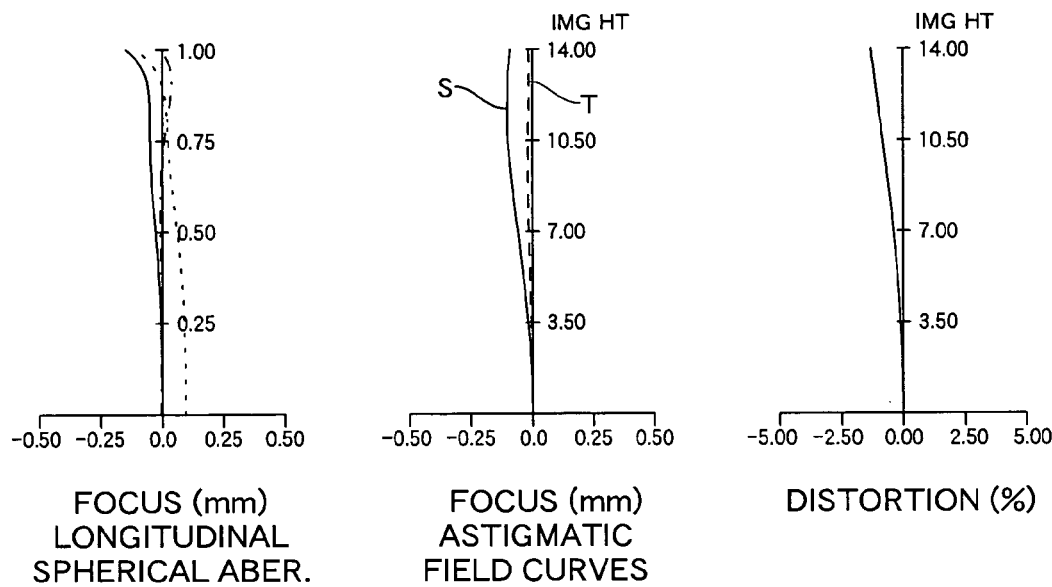
FIG. 3 shows the longitudinal aberration of the projection zoom lens shown in FIG. 2 at the wide-angle end.
Figure 4:
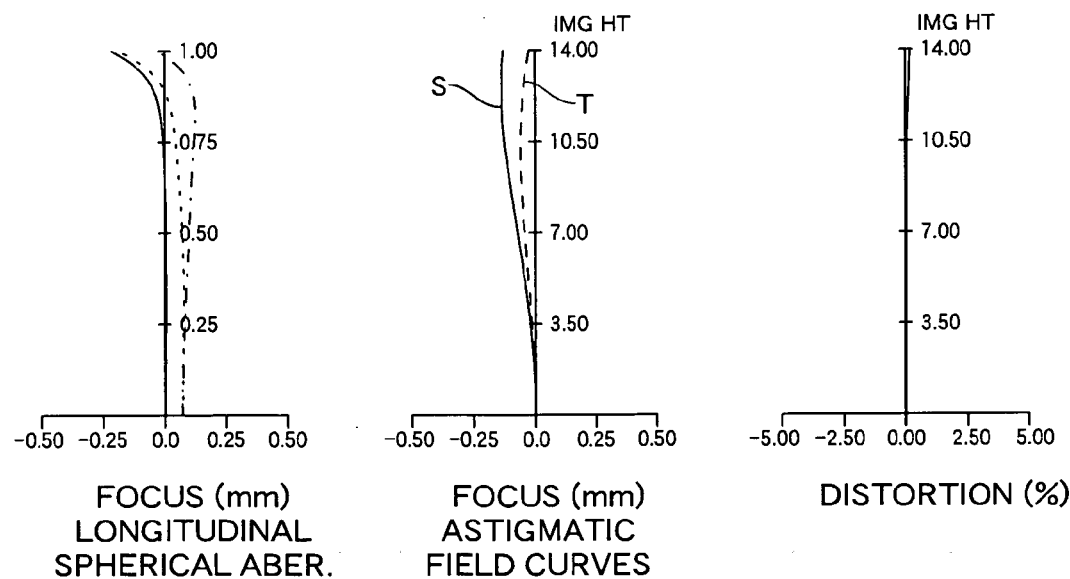
FIG. 4 shows the longitudinal aberration of the projection zoom lens shown in FIG. 2 at the telephoto end.
Figure 5:
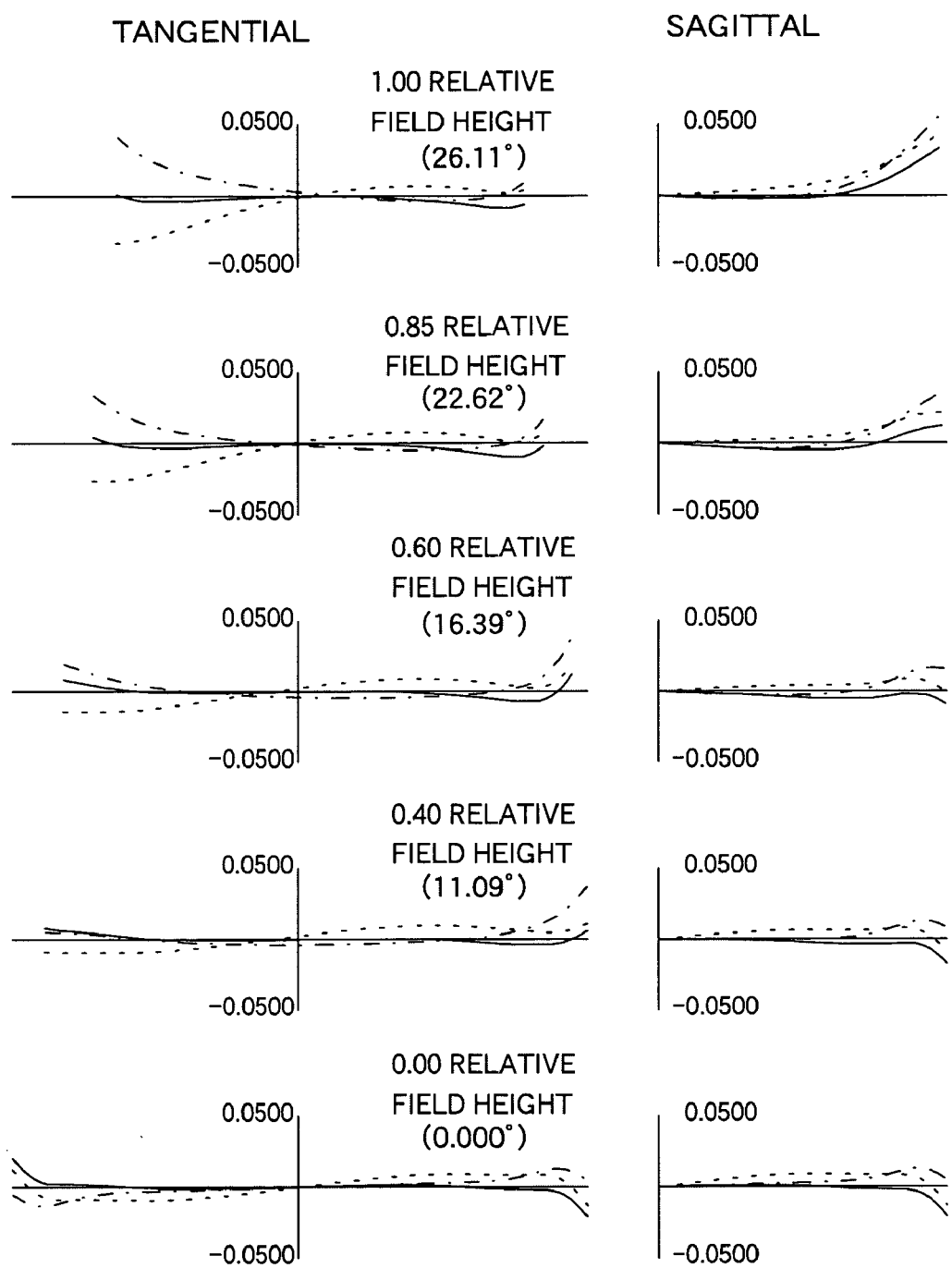
FIG. 5 shows the lateral aberration of the projection zoom lens shown in FIG. 2 at the wide-angle end.
Figure 6:
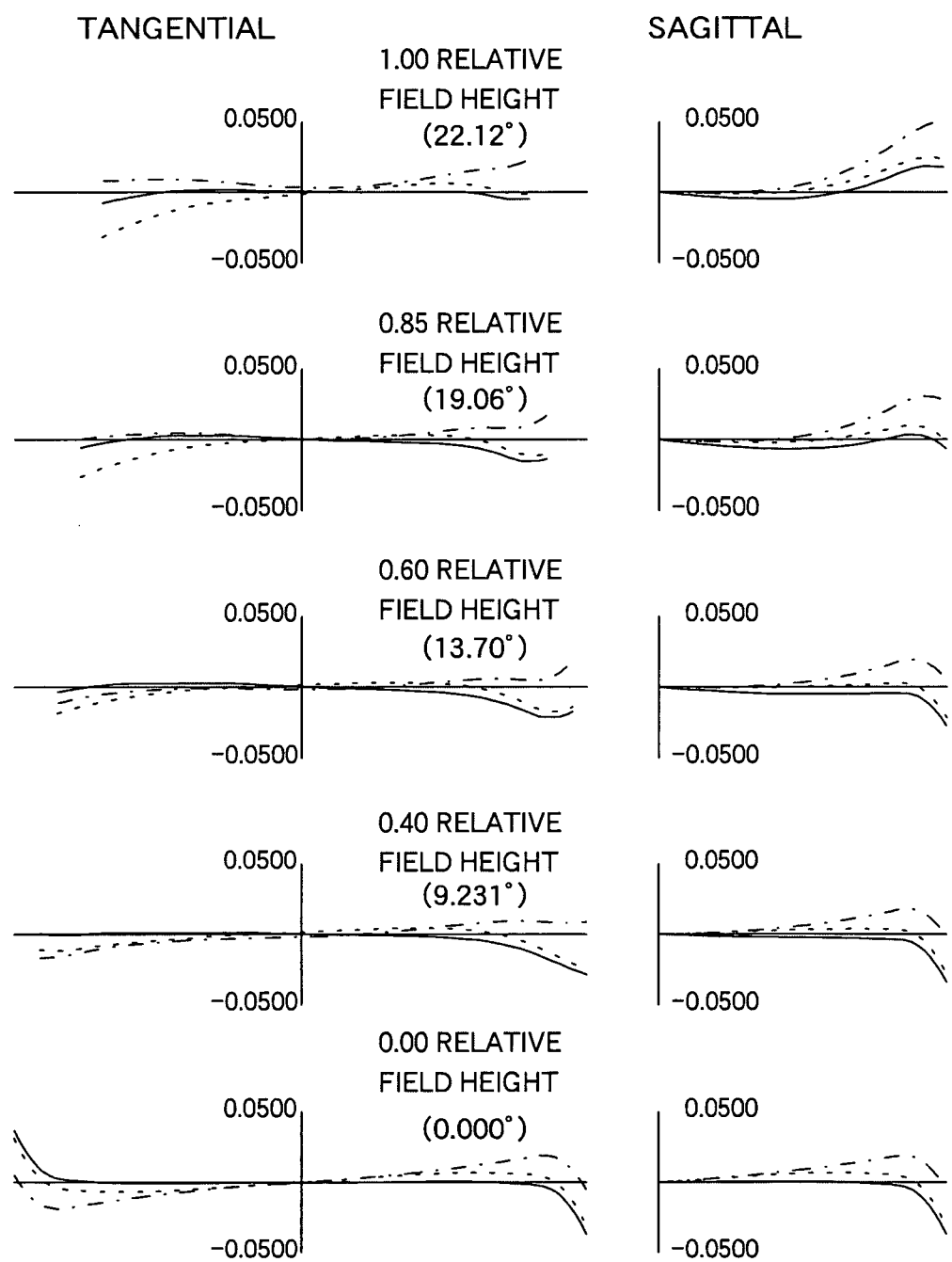
FIG. 6 shows the lateral aberration of the projection zoom lens shown in FIG. 2 at the telephoto end.

FIGS. 3 and 4 show the spherical aberration, astigmatism, and distortion of the projection lens system 5 at the wide-angle end and at the telephoto end. FIGS. 5 and 6 show the spherical aberration (expressed in mm) at the wide-angle end and the telephoto end of lateral aberration graphs. Values of the spherical aberration for the respective wavelengths of 650.0 nm (broken line), 550.0 nm (solid line), and 450.0 nm (dot-dash line) are shown. In the graphs showing the astigmatism and lateral aberration, the aberration for tangential rays (T) and sagittal rays (S) is shown.

As shown in these FIGS., the longitudinal aberration and lateral aberration of the projection zoom lens 5 of the present embodiment are in a range of around ±0.2 mm across almost all of the range from the wide-angle end to the telephoto end, meaning that aberrations are corrected extremely favorably. Accordingly, the projection zoom lens corrects not just longitudinal aberrations but also lateral aberrations extremely favorably and has favorable performance where flare caused by coma aberration (i.e., "coma flare") hardly appears.

The projection zoom lens 5 is a retrofocus type zoom lens system that has a combination of a first lens group G1 with negative power and a second lens group with positive power, is constructed of a total of seven lenses, and is designed so as to be extremely compact. In addition, by using a biconcave negative lens that is the pre-final lens positioned just before the final (positive) lens and asphering both surfaces of the pre-final lens, it is possible to concentrate the aspherical surfaces at the lens with the smallest diameter. For this reason, while using a seven-lens construction, it is possible to achieve favorable aberration-correcting performance and it is possible to obtain an image-forming performance that is equivalent or superior to a conventional zoom lens constructed of ten lenses.

In this way, the projection zoom lens 5 is a compact zoom lens that satisfies the conditions for projecting images formed by the DMD 2 onto a screen, favorably corrects various kinds of aberration, and therefore has high image-forming performance. Accordingly, by installing the projection zoom lens 5, it is possible to realize the compact projector 1 that can project bright images with high resolution that makes full use of the characteristics of the DMD 2. In addition, the zoom lens system 5 that has very compact shape with the construction of just seven lenses can be provided at low cost because the both surfaces of the lens with the smallest diameter are aspheric. Furthermore, since the lens that is aspherized is the lens positioned immediately before the final lens, there is little risk of the aspherical lens becoming off-center during assembly or the like. This makes it easy to achieve the desired optical performance for the projector 1 during assembly, and therefore the projection zoom lens makes it possible to provide a compact projector 1 with favorable optical performance at low cost.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A projection zoom lens that projects, onto a screen side, projection light from a light modulator side including a plurality of elements for changing directions of reflection of light respectively so as to generate an image,
   the projection zoom lens consisting of, in order from the screen side, a first lens group with negative refractive power and a second lens group with positive refractive power, lens included in the first lens group and the second lens group moving together respectively to reduce a distance between the first lens group and the second lens group from a wide-angle end to a telephoto end,
   wherein the second lens group includes, from the light modulator side, a final lens that is a positive lens, a pre-final lens that is a negative biconcave lens positioned next to the final lens, and a stop positioned next to the pre-final lens, and both surfaces of the pre-final lens are aspherical.

2. The projection zoom lens according to claim 1,
   wherein the first lens group consists of, from the screen side, a negative meniscus lens that is convex on the screen side, a biconcave negative lens, and a positive meniscus lens that is convex on the screen side, and
   the second lens group consists of, from the screen side, two positive meniscus lenses that are convex on the screen sides respectively, the stop, the pre-final lens, and the final lens.

3. The projection zoom lens according to claim 1, wherein a combined focal length f1 of the first lens group and a combined focal length f2 of the second lens group satisfy the following condition: $0.5 < |f2/f2| < 0.7$.

4. The projection zoom lens according to claim 1, wherein a combined focal length f1 of the first lens group and a combined focal length fw of the projection zoom lens at a wide-angle end satisfy the following condition: $1.0 < |f1/fw| < 3.0$.

5. The projection zoom lens according to claim 1, wherein a combined focal length f1 of the first lens group and a spatial distance dw between the first lens group and the second lens group at a wide-angle end of the projection zoom lens satisfy the following condition: $0.1 < |dw/f1| < 0.28$.

6. A projector apparatus comprising a projection zoom lens according to claim 1, the light modulator, and a light source system that emits light onto the light modulator.

* * * * *

UNITED STATES PATENT AND TRADEMARK OFFICE
CERTIFICATE OF CORRECTION

| | | |
|---|---|---|
| PATENT NO. | : 7,184,220 B2 | Page 1 of 1 |
| APPLICATION NO. | : 11/274427 | |
| DATED | : February 27, 2007 | |
| INVENTOR(S) | : Akira Sawamoto | |

It is certified that error appears in the above-identified patent and that said Letters Patent is hereby corrected as shown below:

<u>Column 8</u>

Line 17 Change "$0.5<|f2/f2|<0.7$ to -- $0.5<|f2/f1|<0.7$ --.

Signed and Sealed this

Twenty-sixth Day of February, 2008

JON W. DUDAS
*Director of the United States Patent and Trademark Office*